Oct. 22, 1946.  C. H. NORTON  2,409,786
TRUNDLE BASKET
Filed Sept. 12, 1944
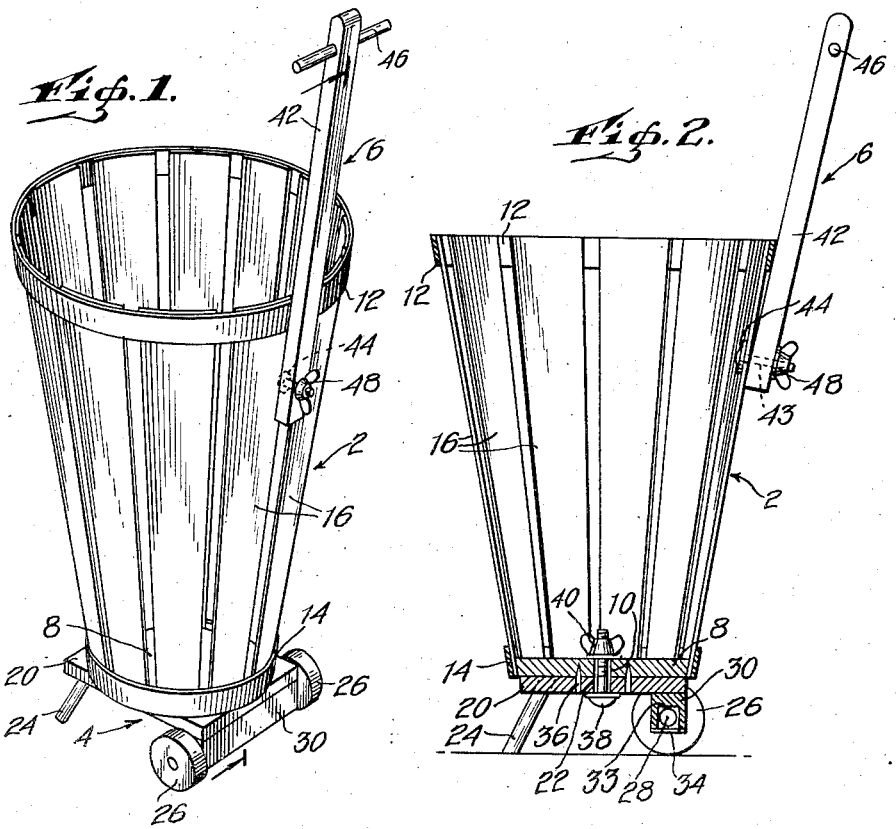
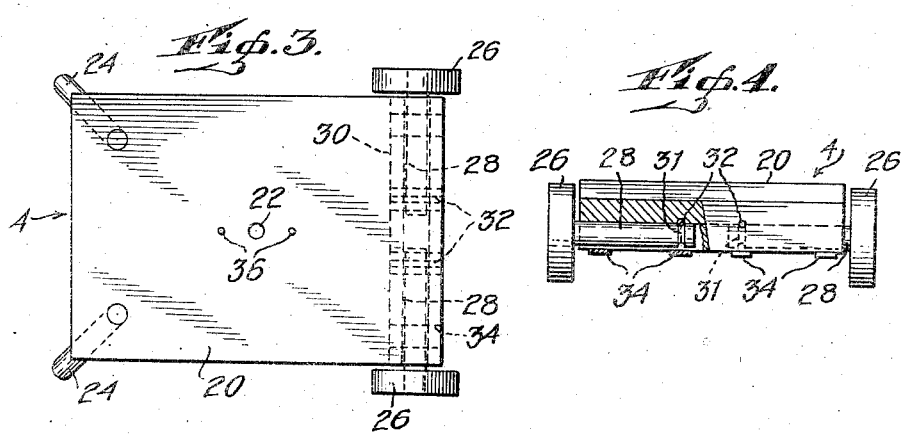
INVENTOR
CHESTER H. NORTON
BY
Bartlett, Eyre, Keel & Weymouth
ATTORNEYS Patented Oct. 22, 1946

2,409,786

UNITED STATES PATENT OFFICE 2,409,786

TRUNDLE BASKET

Chester H. Norton, Katonah, N. Y.

Application September 12, 1944, Serial No. 553,707

3 Claims. (Cl. 280—51)

My present invention relates to small hand portable wagons or baskets for use in shopping or gardening. More specifically the invention comprises a small truck and handle which may be readily and detachably secured to an ordinary standard bushel bean basket to form therewith a light-weight carry-all on wheels. The invention comprises also the resulting light-weight carry-all or trundle basket.

For an understanding of the invention, reference may be had to the accompanying drawing, of which—

Fig. 1 is a perspective view showing the new carry-all on wheels;

Fig. 2 is a vertical sectional view taken on the line 2—2 of Fig. 1;

Fig. 3 is a top plan view of the detachable truck member of the carry-all; and

Fig. 4 is an end view, partly in section, of the truck member.

As shown in the drawing, the wagon or carry-all comprises an ordinary split wood bean basket 2, a truck member 4 and handle 6. The basket 2 is of standard make, preferably of the type that is 20″ high, 15½″ diameter at the top and 9″ diameter at the bottom. The basket has a circular base 8 with a central aperture 10 and walls comprising upper and lower hoops 12 and 14, respectively, with vertical spaced slats 16 secured at their ends by the hoops. The truck member 4 comprises a square or rectangular board 20 having a central aperture 22, a pair of spreading legs 24 and two wheels 26, each fixedly secured or "frozen" to an axle 28 mounted for rotation in a housing 30 secured to the base 20. Preferably, as shown best in Figs. 3 and 4, the axle 28 is formed of two separate parts which permits the wheels 26 to rotate independently. In order that the wheel and axle part will be retained in the housing 30, each axle part is provided near its inner end with an annular groove 31 of sufficient depth and width to accommodate a retaining pin or nail 32. The housing 30 has a transverse opening 33 therein, of generally square cross-section, for reception of the axle parts and within which the axle turns with a loose fit. Short strips 34 across the bottom of the housing prevent the axle from dropping out of the opening 33. The above described parts of the small truck are all made of wood for cheapness and lightness. Wooden wheels when mounted for rotation on wooden axles are unsatisfactory because, if they are made a close fit, swelling caused by dampness causes them to bind, or if with a loose fit to avoid binding, they wobble. With the above described construction in which wooden wheels are "frozen", as by gluing or pegging, to axle parts and the axles are mounted for rotation in an opening of square cross-section, these difficulties, usually encountered with wooden wheels, are avoided. Also, because the wheels are independent, the truck may be readily turned without causing one wheel to slide without rotating.

Mounted on the base 20 of the truck are two nails 36 with their pointed ends extending vertically upward a short distance above the base. When the truck 4 is to be attached to the basket 2, a threaded bolt 38 is inserted through the apertures 10 and 22 and the parts pulled together by a wing nut 40 so as to cause the ends of the nails 36 to enter the wooden base 8 of the basket to prevent turning of the basket on the truck or vice versa.

The detachable handle 6 comprises a length of square or rectangular stock 42 having a hole 43 adjacent one end for reception of a bolt 44 and carrying a small pin or dowel 46 in a transverse bore adjacent the other end, the pin being glued within the bore and serving as a finger engaging member.

When the carry-all is to be assembled, the handle 6 is first secured to the basket by the bolt 44 which passes through a suitable opening between the slats 16 of the basket and through the hole 43 in the piece 42. A wing bolt 48 is then tightened on the bolt 44 to hold the parts firmly together. The basket 2 carrying the handle 6 is then positioned over the truck 4 with the apertures 10 and 22 in alinement and with the center of the housing 30 below the handle 6, the bolt 38 is then passed through the apertures 10 and 22 and the wing nut 40 tightened to force the tips of the nails 36 into the base 8 of the basket.

The so formed two-wheeled basket, when tipped, can be easily pulled along on its wheels. When upright, the spreading feet 24 together with the wheels provide a sturdy non-slipping base. Because of the particular wheel mounting, hereinbefore described, the wagon may be readily pulled around corners, and swelling of the wooden wheels will not interfere with their operation.

From the above description it will be apparent that the invention provides two simple attachments for an ordinary market basket which transforms the basket into a useful wagon for carrying groceries or other purchases or that may be conveniently used around a garden for carrying produce, plants or other articles. Being of wood and of simple construction, the attachments may be economically manufactured, and they require no tools for attaching them to the basket. When a basket breaks or otherwise wears out, the truck and handle, being detachable, may be removed and used again with another basket.

I claim:

1. A detachable truck for market baskets of the type having a base with a central aperture comprising a flat member having a bolt receiving central aperture for alinement with the central aperture in the base of the basket, an axle housing secured to the under side of said base member having a generally square cross-sectional passage therethrough, a two-piece wooden axle rotatably mounted in said passage, a wooden wheel frozen to an end of each axle piece, a pair of legs secured to the under side of said flat member, vertically disposed nails having their points above the upper surface of said flat member, and means for forcing said nails into the base of a basket, said means comprising a bolt passing through the said apertures and a nut threaded thereon.

2. The combination with an ordinary wooden market basket of the type having a centrally apertured circular base and slatted sides, of a truck, a handle and means for detachably securing said truck and handle to the basket, said truck comprising a flat member having an aperture for alinement with the aperture in the base of the basket, a pair of wheels rotatably mounted on the underside of said flat member, and a pair of legs secured to the underside of said flat member, said handle comprising an elongated member having finger gripping means at one end and having a bolt receiving aperture at its other end and said securing means comprising a bolt passing through the alined apertures in the base of the basket and in said flat member, a bolt passing through the aperture in said handle and between slats of the basket sides and nuts threaded on said bolts.

3. The combination according to claim 2 including a housing secured to the under side of said flat member, said housing having a generally square cross-sectional passage therethrough, and a two-piece wooden axle rotatably mounted in said passage, said wheels being frozen to the ends of said axle so as to rotate therewith.

CHESTER H. NORTON.